(12) United States Patent
Christian et al.

(10) Patent No.: US 10,039,116 B1
(45) Date of Patent: *Jul. 31, 2018

(54) LONG TERM EVOLUTION SCHEDULER TO MITIGATE INTERFERENCE

(71) Applicant: Sprint Communications Company L.P., Overland Park, KS (US)

(72) Inventors: Brett Lee Christian, Independence, MO (US); Saied Kazeminejad, Ashburn, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/466,590

(22) Filed: Aug. 22, 2014

Related U.S. Application Data (63) Continuation of application No. 13/437,386, filed on Apr. 2, 2012.

(51) Int. Cl.
*H04W 72/08* (2009.01)

(52) U.S. Cl.
CPC .................... *H04W 72/082* (2013.01)

(58) Field of Classification Search
CPC .... H04W 28/04; H04W 72/082; H04W 16/10
See application file for complete search history.

(56) References Cited

U.S. PATENT DOCUMENTS

| | | | |
|---|---|---|---|
| 8,135,396 B2 | 3/2012 | Terabe et al. | |
| 8,315,217 B2 | 11/2012 | Montojo et al. | |
| 8,874,157 B1 | 10/2014 | Shetty et al. | |
| 9,100,972 B2 * | 8/2015 | Kim | H04J 11/0056 |
| 9,295,003 B2 | 3/2016 | Oteri et al. | |
| 9,642,121 B2 | 5/2017 | Song et al. | |
| 2008/0070586 A1 * | 3/2008 | Kermoal | H04L 5/003 455/452.2 |
| 2008/0259802 A1 | 10/2008 | Pedersen et al. | |

(Continued)

FOREIGN PATENT DOCUMENTS

| | | | | |
|---|---|---|---|---|
| CA | 2809721 A1 * | 3/2012 | .......... | H04W 72/082 |
| CN | 102932930 A * | 2/2013 | ........ | H04W 72/1231 |

(Continued)

OTHER PUBLICATIONS

Non-Final Office Action dated Oct. 23, 2013, in U.S. Appl. No. 13/437,383, 17 pages.

(Continued)

*Primary Examiner* — Hassan Kizou
*Assistant Examiner* — Deepa Belur (57) ABSTRACT

A computer-implemented method, system, and computer-readable storage media for scheduling physical resource blocks (PRBs) comprises a communication radio access network (RAN) base station with a scheduler that assigns one or more PRBs to a communication channel of a user device. The PRBs can be prioritized according to a radio frequency (rf) interference level across the contiguous band of PRBs. The rf interference level of a communication channel of the user device can be monitored by the scheduler. The scheduler assigns one or more of the prioritized PRBs according to the rf interference level of the PRBs and according to the rf interference level of the communication channel of the user device.

14 Claims, 6 Drawing Sheets

(56) References Cited

U.S. PATENT DOCUMENTS

| | | |
|---|---|---|
| 2008/0292032 A1 | 11/2008 | Belogolovy et al. |
| 2009/0086843 A1 | 4/2009 | Li |
| 2009/0239524 A1 | 9/2009 | Terabe et al. |
| 2010/0151876 A1* | 6/2010 | Park ............... H04W 72/082 455/452.2 |
| 2010/0197314 A1 | 8/2010 | Maaref et al. |
| 2010/0214997 A1 | 8/2010 | Tao et al. |
| 2010/0246503 A1 | 9/2010 | Fox et al. |
| 2010/0322227 A1 | 12/2010 | Luo |
| 2011/0003611 A1* | 1/2011 | Haas ............... H04W 52/10 455/512 |
| 2011/0053589 A1 | 3/2011 | Kimura et al. |
| 2011/0081865 A1 | 4/2011 | Xiao et al. |
| 2011/0116490 A1 | 5/2011 | Wilhelmsson et al. |
| 2011/0136499 A1 | 6/2011 | Miyata |
| 2011/0274022 A1 | 11/2011 | Chen et al. |
| 2011/0319088 A1 | 12/2011 | Zhou et al. |
| 2012/0009909 A1 | 1/2012 | Lau |
| 2012/0014333 A1 | 1/2012 | Ji et al. |
| 2012/0014348 A1 | 1/2012 | Tanno et al. |
| 2012/0014360 A1 | 1/2012 | Zou et al. |
| 2012/0014371 A1 | 1/2012 | Weng et al. |
| 2012/0014468 A1 | 1/2012 | Wu et al. |
| 2012/0015603 A1 | 1/2012 | Proctor, Jr. et al. |
| 2012/0015653 A1 | 1/2012 | Paliwal et al. |
| 2012/0015658 A1 | 1/2012 | Kim et al. |
| 2012/0015664 A1* | 1/2012 | Han ............... H04W 72/082 455/452.1 |
| 2012/0020209 A1 | 1/2012 | Ghosh et al. |
| 2012/0020230 A1 | 1/2012 | Chen et al. |
| 2012/0020248 A1 | 1/2012 | Granlund et al. |
| 2012/0020286 A1 | 1/2012 | Damnjanovic et al. |
| 2012/0020311 A1 | 1/2012 | Yamada et al. |
| 2012/0020321 A1 | 1/2012 | Higuchi et al. |
| 2012/0020323 A1 | 1/2012 | Noh et al. |
| 2012/0020421 A1 | 1/2012 | Larsson et al. |
| 2012/0021753 A1 | 1/2012 | Damnjanovic et al. |
| 2012/0021755 A1 | 1/2012 | Chin et al. |
| 2012/0021757 A1 | 1/2012 | Abgrall et al. |
| 2012/0021788 A1 | 1/2012 | Yavuz et al. |
| 2012/0021798 A1 | 1/2012 | Ishii et al. |
| 2012/0021800 A1 | 1/2012 | Wilson et al. |
| 2012/0026896 A1 | 2/2012 | Li et al. |
| 2012/0026963 A1 | 2/2012 | Kim et al. |
| 2012/0026964 A1 | 2/2012 | Koivisto et al. |
| 2012/0026965 A1 | 2/2012 | Cho et al. |
| 2012/0026969 A1 | 2/2012 | Fukuoka et al. |
| 2012/0026986 A1 | 2/2012 | Dass |
| 2012/0028648 A1 | 2/2012 | Chayat et al. |
| 2012/0040620 A1 | 2/2012 | Fu et al. |
| 2012/0082058 A1 | 4/2012 | Gerstenberger et al. |
| 2012/0120893 A1 | 5/2012 | Baligh et al. |
| 2012/0134267 A1 | 5/2012 | Noriega et al. |
| 2012/0236736 A1 | 9/2012 | Frank et al. |
| 2012/0238263 A1* | 9/2012 | Caretti ............... H04W 16/10 455/426.1 |
| 2012/0244871 A1* | 9/2012 | Zhao ............... H04W 16/10 455/452.1 |
| 2012/0250565 A1 | 10/2012 | Zhang et al. |
| 2012/0257519 A1 | 10/2012 | Frank et al. |
| 2012/0275327 A1 | 11/2012 | Zangi et al. |
| 2012/0322453 A1 | 12/2012 | Weng et al. |
| 2012/0329503 A1 | 12/2012 | Jöngren et al. |
| 2013/0005379 A1 | 1/2013 | Yamazaki |
| 2013/0005388 A1 | 1/2013 | Naka et al. |
| 2013/0010749 A1 | 1/2013 | Chang et al. |
| 2013/0021999 A1 | 1/2013 | Jiang |
| 2013/0040683 A1 | 2/2013 | Siomina et al. |
| 2013/0044602 A1 | 2/2013 | Xiao et al. |
| 2013/0053039 A1 | 2/2013 | Jorguseski et al. |
| 2013/0115999 A1 | 5/2013 | Sirotkin et al. |
| 2013/0150068 A1 | 6/2013 | Hui et al. |
| 2013/0163536 A1 | 6/2013 | Anderson et al. |
| 2013/0170439 A1 | 7/2013 | Anderson et al. |
| 2013/0195051 A1* | 8/2013 | Koivisto ............... H04W 72/04 370/329 |
| 2013/0208664 A1 | 8/2013 | Viswanathan |
| 2013/0223483 A1 | 8/2013 | Ghassemzadeh et al. |
| 2013/0229943 A1 | 9/2013 | Huang et al. |
| 2013/0249297 A1 | 9/2013 | Luo et al. |
| 2013/0258869 A1 | 10/2013 | Zhou et al. |
| 2013/0315156 A1 | 11/2013 | Xiao et al. |
| 2013/0336274 A1* | 12/2013 | Simonsson et al. ......... 370/329 |
| 2014/0031031 A1* | 1/2014 | Gauvreau et al. ......... 455/426.1 |
| 2014/0057618 A1 | 2/2014 | Zirwas et al. |
| 2014/0071836 A1* | 3/2014 | Panchal ............... 370/248 |
| 2014/0078951 A1 | 3/2014 | Venkatachari et al. |
| 2014/0098748 A1* | 4/2014 | Chan ............... H04W 72/082 370/329 |
| 2014/0105135 A1 | 4/2014 | Tellado et al. |
| 2014/0113644 A1* | 4/2014 | Burchardt et al. ......... 455/452.1 |
| 2014/0146689 A1* | 5/2014 | Gaur et al. ............... 370/252 |
| 2014/0192769 A1 | 7/2014 | Wen |
| 2014/0233468 A1 | 8/2014 | Hejazi et al. |
| 2014/0256336 A1* | 9/2014 | Manssour ............... H04L 1/0026 455/450 |
| 2014/0269456 A1* | 9/2014 | Wang et al. ............... 370/280 |
| 2014/0328309 A1* | 11/2014 | Comstock ............... 370/329 |
| 2015/0016434 A1 | 1/2015 | Luo et al. |
| 2016/0113028 A1* | 4/2016 | Caretti ............... H04W 16/10 370/336 |
| 2016/0127069 A1* | 5/2016 | Nuss ............... H04W 16/10 370/329 |
| 2016/0353290 A1 | 12/2016 | Nammi et al. |

FOREIGN PATENT DOCUMENTS

| | | | |
|---|---|---|---|
| EP | 2456262 A1 | 5/2012 | |
| EP | 2552152 A1 | 1/2013 | |
| WO | WO 2013020512 A1 * | 2/2013 | ........ H04W 72/1231 |
| WO | WO 2014131190 A1 * | 9/2014 | ............ H04W 16/10 |

OTHER PUBLICATIONS

Non-Final Office Action dated May 16, 2014, in U.S. Appl. No. 13/437,383, 19 pages.

Non-Final Office Action dated Aug. 13, 2013, in U.S. Appl. No. 13/437,386, 17 pages.

Non-Final Office Action dated Feb. 25, 2014, in U.S. Appl. No. 13/437,386, 19 pages.

Notice of Allowance dated Jun. 12, 2014, in U.S. Appl. No. 13/437,386, 9 pages.

Final Office Action dated Oct. 22, 2014, in U.S. Appl. No. 13/437,383, 19 pages.

Non-Final Office Action dated Nov. 21, 2014 in U.S. Appl. No. 13/437,386, 11 pages.

Non-Final Office Action dated Mar. 19, 2015 in U.S. Appl. No. 13/437,383, 22 pages.

Final Office Action dated Oct. 2, 2015 in U.S. Appl. No. 13/437,383, 22 pages.

Non-Final Office Action dated Feb. 11, 2016 in U.S. Appl. No. 13/437,386, 16 pages.

Final Office Action dated May 21, 2015 in U.S. Appl. No. 13/437,386, 14 pages.

Notice of Allowance dated May 18, 2016 in U.S. Appl. No. 13/437,383, 10 pages.

Final Office Action dated Aug. 31, 2016 in U.S. Appl. No. 13/437,486, 20 pages.

Analytical Evaluation of Fractional Frequency Reuse for OFDMA Cellular Networks. Thomas David Novlan, Radha Krishna Ganti, Arunabha Ghosh, Jeffrey G. Andrews; Jan. 26, 2011, 25 pages.

Notice of Allowance dated Sep. 12, 2016 in U.S. Appl. No. 13/437,383, 6 pages.

First Action Interview Preinterview Communication dated Apr. 7, 2017 in U.S. Appl. No. 15/227,712, 5 pages.

(56) References Cited

OTHER PUBLICATIONS

First Action Interview Office Action dated Jul. 25, 2017 in U.S. Appl. No. 15/227,712,, 18 pages.

* cited by examiner

LONG TERM EVOLUTION SCHEDULER TO MITIGATE INTERFERENCE

CROSS-REFERENCE

This application is related by subject matter to "Uplink Interference Mitigation," U.S. Ser. No. 13/437,383, filed on Apr. 2, 2012; and U.S. Ser. No. 15/227,712, filed on 4 Aug. 2016.

SUMMARY

Embodiments of the invention are defined by the claims below. A high-level overview of various embodiments of the invention is provided to introduce a summary of the systems, methods, and media that are further described in the detailed description section. This summary is neither intended to identify key features or essential features of the claimed subject matter, nor is it intended to be used as an aid in isolation to determine the scope of the claimed subject matter.

In an embodiment of the invention, a computer-implemented system for scheduling physical resource blocks is described. The system includes a communication radio access network (RAN) base station. The RAN base station includes a scheduler that assigns one or more physical resource blocks (PRBs) to a communication channel of a user device. The scheduler assigns one or more of the PRBs to the user device according to the rf interference level of the PRBs and according to the rf interference level of the communication channel of the user device.

In another embodiment of the invention, a computer-implemented method of scheduling PRBs is described. A plurality of PRBs are prioritized according to their respective rf interference levels. The rf interference level of a communication channel of a device is monitored. One or more of the prioritized PRBs are assigned by a scheduler of a base station to the device based upon the rf interference level of the communication channel of the device.

In still another embodiment, one or more computer-readable storage media with instructions embodied thereon and executed by a computing device for performing a method of scheduling physical resource blocks is described. A plurality of PRBs are divided into one or more zones according to a level of rf interference of the PRBs. A scheduler of a base station assigns one or more of the zones to a user device based upon a noise level of a communication channel of the user device.

BRIEF DESCRIPTION OF THE SEVERAL VIEWS OF THE DRAWINGS

Illustrative embodiments of the invention are described in detail below, with reference to the attached drawing figures, which are incorporated by reference herein, and wherein.

DETAILED DESCRIPTION

Embodiments of the invention provide systems, methods, and computer-readable media with computer-readable instructions embodied thereon for using a scheduler to assign one or more physical resource blocks to a communications channel according to the radio frequency interference levels of the physical resource blocks and the communications channel. The terms "step," "block," etc. might be used herein to connote different acts of methods employed, but the terms should not be interpreted as implying any particular order, unless the order of individual steps, blocks, etc. is explicitly described. Likewise, the term "module," etc. might be used herein to connote different components of systems employed, but the terms should not be interpreted as implying any particular order, unless the order of individual modules, etc. is explicitly described.

Throughout the description of different embodiments of the invention, several acronyms and shorthand notations are used to aid the understanding of certain concepts pertaining to the associated systems, methods and computer-readable media. These acronyms and shorthand notations are intended to help provide an easy methodology for communicating the ideas expressed herein and are not meant to limit the scope of any embodiment of the invention.

Embodiments of the invention include, among other things, a method, system, or set of instructions embodied on one or more computer-readable media. Computer-readable media include both volatile and nonvolatile media, removable and non-removable media, and media readable by a database and various other network devices. Computer-readable media comprise computer storage media. By way of example, and not limitation, computer-readable media comprise media implemented in any method or technology for storing information. Examples of stored information include computer-useable instructions, data structures, program modules, and other data representations. Media examples include, but are not limited to, information-delivery media, Random Access Memory (RAM), Read Only Memory (ROM), Electronically Erasable Programmable Read Only Memory (EEPROM), flash memory or other memory technology, Compact Disc (CD) ROM, digital versatile discs (DVD), holographic media or other optical disc storage, magnetic cassettes, magnetic tape, magnetic disk storage, and other magnetic storage devices. These technologies can store data momentarily, temporarily, or permanently. The computer readable media include cooperating or interconnected computer readable media, which exist exclusively on a processing system or distributed among multiple interconnected processing systems that may be local to, or remote from, the processing system. Combinations of any of the above should also be included within the scope of computer-readable media.

An operating environment for devices and interfaces used for embodiments of the invention include a processing system with one or more high speed central processing unit(s) ("CPU"), or other types of processors, a memory component, and a data storage component. The embodiments of the invention are described below with reference to acts and symbolic representations of operations or instructions that are performed by the processing system, unless indicated otherwise. Such acts and operations or instructions are referred to as being "computer executed," "CPU executed," or "processor executed." The memory locations where data bits are maintained are physical locations that have particular electrical, magnetic, optical, or organic properties corresponding to the data bits.

Figure 1:
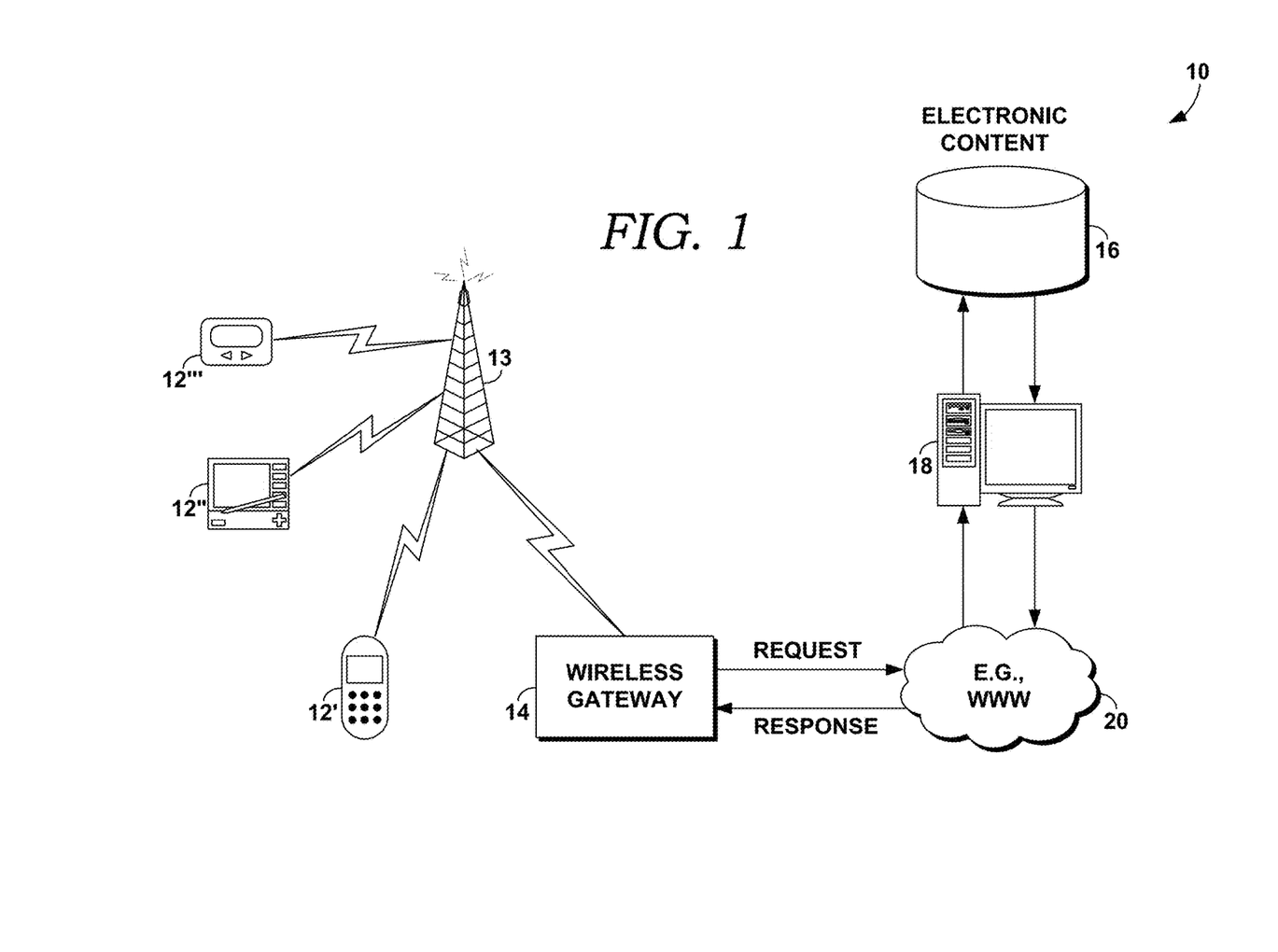
FIG. 1 is a block diagram of a telecommunications system according to embodiments of the invention.

An overview of a telecommunications system will be described, with reference to a block diagram of FIG. 1, which illustrates an exemplary wireless network system 10. Wireless network system 10 includes mobile devices 12, a wireless gateway 14, a database 16 including electronic content, a database server 18, and an information network 20, such as the World Wide Web (WWW). However, none of the embodiments of the invention are limited to these components and more, fewer, or other components can also be used in wireless network system 10. For simplicity, only one wireless gateway 14, database 16, and database server 18 are illustrated in FIG. 1. However, embodiments of the invention also contemplate multiple gateways, databases, and database servers.

The mobile devices 12 include a mobile phone 12', a personal digital assistant ("PDA") 12", a one and two-way pager 12''' and other types of mobile devices (not illustrated). Mobile devices 12 may include devices that typically connect using a wireless communications medium such as radio frequency (RF) devices, infrared (IR) devices, or integrated devices combining one or more of the preceding devices. A mobile device, as described herein, refers to any type of wireless phone, handheld device, personal digital assistant (PDA), BlackBerry®, smartphone, digital camera, or other mobile devices (aside from a laptop) capable of communicating wirelessly. One skilled in the art will appreciate that mobile devices will also include a processor and computer-storage media to perform various functions. In embodiments, computing devices can also refer to devices that are running applications of which images are captured by the camera in a mobile device.

The mobile devices 12 encompass a general computing system used in accordance with embodiments of the invention. A mobile device computing system includes a bus that directly or indirectly couples a memory region, one or more processors, one or more presentation components, input/output ports, input/output components, and a power supply. The bus may be representative of one or more busses, such as an address bus, data bus, or any combination thereof.

The information network 20 is configured to allow network connections between a client device and other networked devices, such as database server 18. The information network 20 may be configured to employ a means of communicating information from one computing device to another, such as through a universal serial bus (USB) port, Ethernet link, or any combination thereof. In one embodiment, the information network 20 may be the Internet, or may include local area networks (LANs), wide area networks (WANs), or direct connections.

Information network 20 may further employ a plurality of wireless access technologies including, but not limited to, $2^{nd}$ (2G), $3^{rd}$ (3G), and $4^{th}$ (4G) generation radio access for cellular systems, Wireless-LAN, or Wireless Router (WR) mesh. Access technologies such as 2G, 3G, 4G, and future access networks may enable wide area coverage for network devices with various degrees of mobility. For example, the information network 20 may enable a wireless network connection over one of the aforementioned access technologies using a protocol for wireless data transfer such as Global System for Mobile communication (GSM), General Packet Radio Services (GPRS), Enhanced Data GSM Environment (EDGE), and Wideband Code Division Multiple Access (WCDMA).

The wireless gateways 14 provide a code division multiple access ("CDMA"), Wideband CDMA ("WCDMA"), Time Division-Synchronous CDMA ("TD-SCDMA"), Advanced Mobile Phone Service ("AMPS"), Digital AMPS ("D-AMPS"), Universal Mobile Telecommunications System ("UMTS"), Radio Frequency ("RF"), paging and wireless messaging, Personal Communication Network ("PCN"), Global System for Mobile Communications, "GSMC"), Worldwide Interoperability for Microwave Access (WiMAX), Generic Packet Radio Services ("GPRS"), Personal Communications Services ("PCS"), Cellular Digital Packet Data ("CDPD"), Wireless Application Protocol ("WAP"), Digital Audio Broadcasting ("DAB"), Bluetooth, 802.11a, 802.11b, or other types of wireless interfaces for the mobile devices 12. The WAP includes several protocols and standards designed to provide mobile devices with access to electronic content, and it was developed as an alternative to other markup languages and protocols developed for the World Wide Web. One component of the WAP is a Wireless Markup Language ("WML"), which includes markup tags, and provides control over formatting and layout of electronic content. The WML is often more appropriate to use for mobile devices such as wireless phones than other markup languages such as Hyper Text Markup Language ("HTML"), etc.

The wireless gateway 14 includes virtually any device that forwards network traffic. Such devices include, for example, routers, proxies, firewalls, access points, link load balancers, devices that perform network address translation, or any combination of the preceding devices. The wireless gateway 14 may recognize packets that are part of a particular communication protocol or are the same network connection or application session. The wireless gateway 14 may perform special processing on such packets including granting access to a client machine, logging or not logging an event, or network address and port translation.

The database 16 includes electronic content such as text, hypertext, graphical data or references to graphical data images, audio, video, and other content. The electronic content may be stored as a web page or WAP page on a database server, such as server 18. The server 18 can download electronic content from the database 16 to the mobile device 12.

Server 18 includes any computing device capable of establishing or maintaining a network connection with a client device. In one embodiment, server 18 is configured to operate as a web server. The server 18 can also operate as a messaging server, File Transfer Protocol (FTP) server, chat server, media server, or online gaming server. In addition, server 18 can be a single component in a larger online application. Devices that can operate as server 18 include, but are not limited to, personal computers, multiprocessor systems, microprocessor-based or programmable consumer electronics, network personal computers, or integrated devices combining one or more of the preceding devices.

A hypertext document includes markup codes called "tags." The structure of hypertext documents is defined by document markup languages such as Hand Held Device Markup Language ("HDML"), HTML, compact HTML ("cHTML"), eXtensible Markup Language ("XML"), WML and voice extensible Markup Language (VoxML"), and others. Markup languages also allow references to additional electronic content other than text, including graphics, animation, audio, video, applets, and other electronic data.

Electronic content is displayed on a mobile device 12 with a software application, such as but not limited to a "browser." A browser on a mobile device 12 may be a subset of a larger browser, or a micro-browser. A micro-browser may not be capable of fully displaying content requested from the database server 18. A micro-browser reads electronic content and renders the electronic content into a presentation, such as but not limited to text, graphics, animation, audio, video, etc., for display on the mobile device 12.

The mobile devices 12 illustrated in FIG. 1 interact with wireless network system 10 based on standards proposed by the Institute of Electrical and Electronic Engineers ("IEEE"), International Telecommunications Union-Telecommunication Standardization Sector ("ITU"), Internet Engineering Task Force ("IETF"), Wireless Application Protocol ("WAP") Forum, Java Community, the American National Standard Institute ("ANSI"), or other proprietary standards.

Each mobile device 12 is coupled to a communication tower 13 via a wireless link, as illustrated in FIG. 1. Each mobile device 12 is capable of communicating with the communication tower 13 using multiple frequency bands. A frequency band is a selected frequency range in the electromagnetic spectrum. Selected frequency bands are designated for use with wireless communications such as wireless telephony. The mobile devices 12 may use frequency bands, frames, air-interface allocation units (slots), etc. specified by the WiMAX specifications. The communication tower 13 may be any wireless system that provides the air interface to mobile devices 12. Communication tower 13 includes a base transceiver station (BTS). Communication tower 13 may include transceivers, power amplifiers, combiners, duplexers, and antennas. Communication tower 13 may also include other components, such as a control function or control computer.

Wireless mobile communication technology uses various standards and protocols to transmit data between a base transceiver station (BTS) of the communication tower 13 and a mobile device 12. A first mobile device 12, such as 12', may be using a first frequency band. A second mobile device 12, such as 12", may be using a second frequency band. The first mobile device 12' may be associated with a first air-interface utilization, while the second mobile device 12" may be associated with a second air-interface utilization. An air interface utilization may correspond to an uplink communication or a downlink communication.

Figure 2:
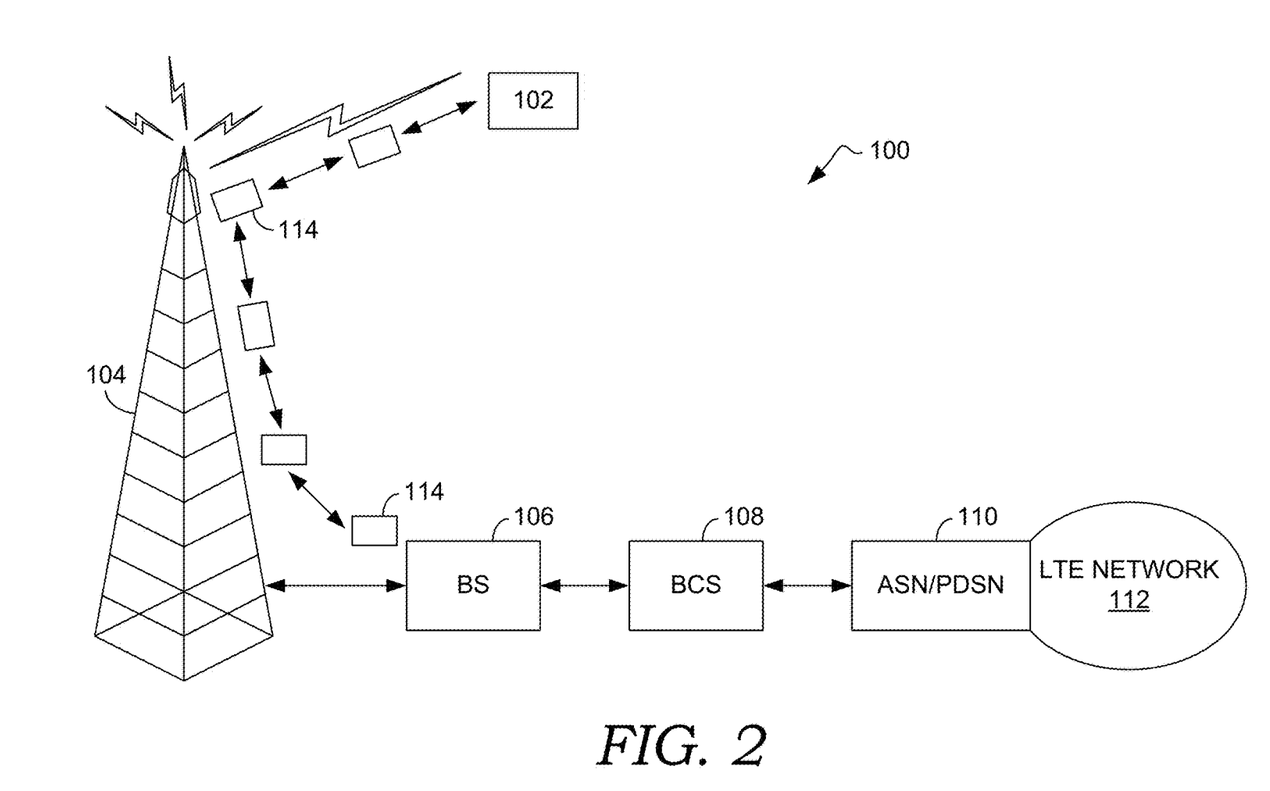
FIG. 2 is a block diagram of a communications network according to embodiments of the invention.

FIG. 2 is a block diagram of a communications network 100 according to embodiments of the invention. Mobile device 102 includes a communication interface that allows the mobile device 102 to transmit information via radio signals to a communication tower 104. A base station (BS) 106 contains equipment for transmitting and receiving radio signals from the communication tower 104. In an embodiment of the invention, BS 106 comprises a radio access network (RAN). In another embodiment of the invention, the BS 106 comprises an enhanced Node B (eNode B). BS 106 also has other equipment for encrypting and decrypting communication with a base station controller (BSC) 108. The BSC 108 may be configured to receive radio signals that are converted into Time Division Multiplexing (TDM) from the BS 106. In an embodiment of the invention, the BSC 108 has a plurality of BSs under its control. The BSC 108 can handle the allocation of radio channels, receive measurements from mobile devices, and control handovers from one BS to another BS. The BSC 108 can be configured to send voice information from the TDM signal to a mobile switching center (MSC) and data information to an access service network (ASN) or a packet data serving node (PDSN), illustrated as ASN/PDSN 110 of a long term evolution (LTE) network 112. The ASN/PDSN 110 can act as a connection point between the radio access network (RAN) and an internet protocol (IP) network. The ASN/PDSN 110 can be responsible for managing point-to-point protocol (PPP) sessions between the mobile device's core IP network and the mobile device 102.

FIG. 2 also illustrates one or more physical resource blocks (PRB) 114. A PRB is a two-dimensional (time and frequency) channel allocation. In an example, given for illustrative purposes only, a communication carrier may control a band of twenty-four contiguous PRBs. The center PRBs will have the least amount of rf interference, while the PRBs at the edges of the contiguous group will have the most rf interference. PRBs within the middle regions of the contiguous group will have a moderate amount of rf interference.

In an embodiment of the invention, the contiguous band of PRBs 114 are divided into a number of zones by an associated scheduler, according to a level of external radio frequency (rf) interference that is being experienced. There is no set number of PRBs assigned to a zone. As an example for illustrative purposes only, a zone may comprise four to five PRBs. FIG. 2 illustrates that one or more PRBs 114 are conveyed to and from the BS 106, and to and from the mobile device 102. The PRBs 114 at the edge of the contiguous band of PRBs 114 are likely to experience more interference than the central PRBs of the contiguous band of PRBs 114. As a result, one or more central zones would be assigned by the scheduler to an edge cell user, where an edge cell user is more likely to experience a high level of rf interference. On the other hand, one or more edge zones would be assigned to a user device with a low level of rf interference. If an edge zone is assigned to a user device with a poor communication connection, then the connection would likely be lost, since the user device was already near its threshold for being able to maintain its connection. The zones could also be prioritized by the level of rf interference, according to embodiments of the invention.

Figure 3:
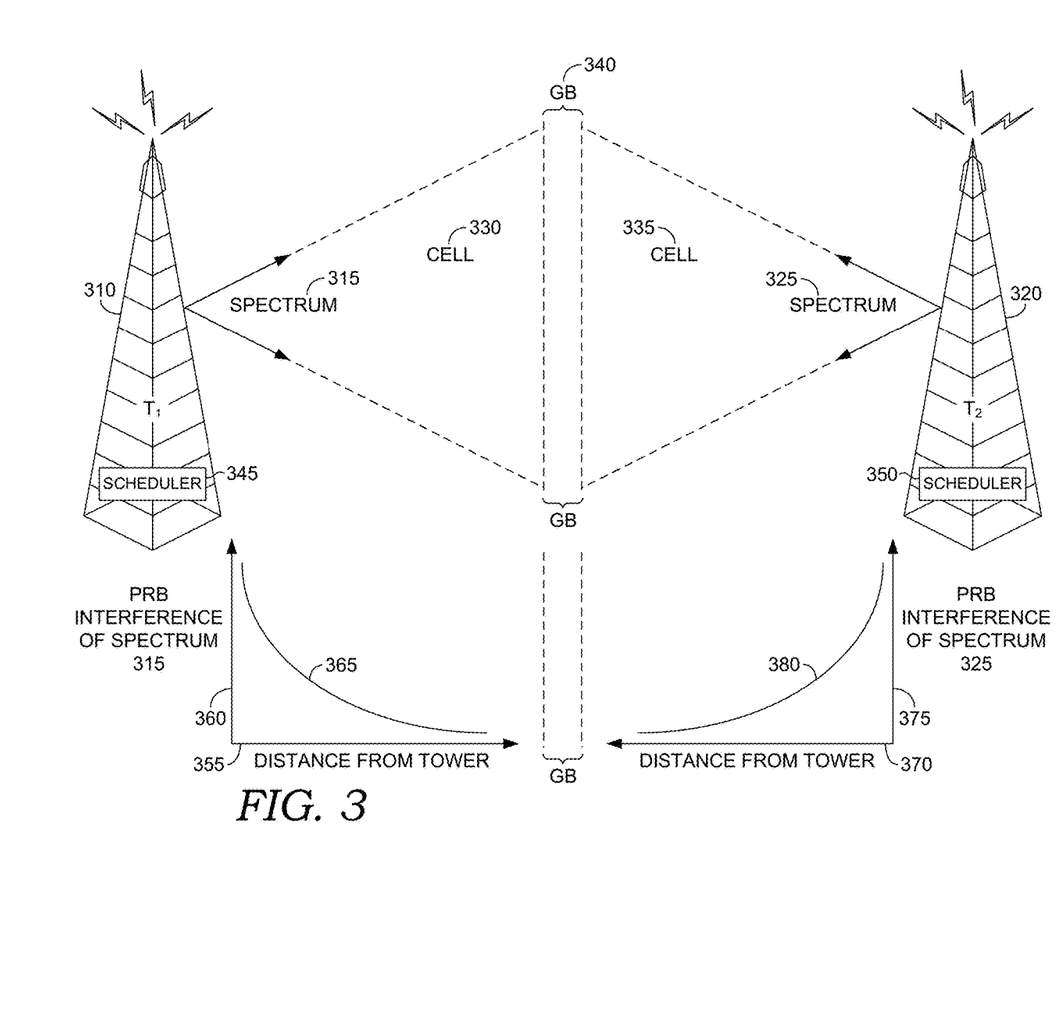
FIG. 3 is a block diagram that illustrates assignment of the physical resource blocks (PRBs) according to embodiments of the invention.

FIG. 3 is a block diagram that illustrates assignment of the PRBs to a particular communication channel of a respective user device that is operating within an area of bandwidth transmission from a transmitting tower. FIG. 3 illustrates two communication towers, 310 and 320. The communication towers 310 and 320 each transmit a specified range of bandwidth frequencies, which is also referred to as a spectrum. Communication tower 310 transmits a particular spectrum, illustrated as spectrum 315 to a defined area, such as cell 330. Communication tower 320 transmits another spectrum, illustrated as spectrum 325 to another defined area, cell 335. Communication standards bodies and other governing agencies limit the amount of power that can be transmitted near a cell edge, so that it does not interfere with another transmitting spectrum. A guard block (GB), such as GB 340 is formed at the adjacent edges of cell 330 and cell 335, so that the spectrum of the two cells do not interfere with each other. A guard block occupies a certain amount of spectrum bandwidth, and the guard block needs to be large enough in bandwidth to reduce interference of one spectrum with another nearby spectrum within an acceptable level. In FIG. 3, GB 340 blocks interference of spectrum 315 with spectrum 325.

FIG. 3 also illustrates a scheduler 345 as part of communication tower 310, and a scheduler 350 as part of communication tower 320. The schedulers 345 and 350 manage assignment of PRBs for their respective communication towers 310 and 320. The lower portion of FIG. 3 illustrates how the scheduler assigns one or more PRBs to a user device. As a user device moves farther away from its transmitting communication tower 310 or 320, the strength of the communication channel becomes weaker and is more prone to noise. Noise, as used herein, could be anything that interferes with or reduces the effective radio signal received from a transmitting tower by a receptive user device. Examples of noise include, but are not limited to interference from other user devices, interference from a nearby infringing spectrum, physical structures, geographic structures, and weather conditions. Therefore, the user device is in need of one or more low-interference-level PRBs to maintain its connection as it moves farther away from its transmitting tower 310 or 320. If a user device that is located far from its transmitting tower received one or more PRBs with a high level of rf interference, then the communication connection would likely be lost. In like manner, a user device that is located close to its transmitting tower does not have a need for low-interference-level PRBs. Therefore, the user device could be assigned one or more PRBs, by the scheduler associated with its transmitting tower, which have a high level of rf interference and still maintain its connection.

The relationship between the level of rf interference of one or more PRBs to the level of rf interference of a user device communication channel is illustrated in the lower portion of FIG. 3. The lower left graph illustrates the above relationship for a user device operating within cell 330 region. The x-axis 355 represents a distance of a user device from the transmitting tower 310, where the distance from the tower increases to the right. The y-axis 360 represents the level of rf interference of the PRBs of spectrum 315, that can be assigned by scheduler 345 to the user device, where the rf interference increases upwards. The curve 365 illustrates an inversely proportional relationship between the PRB interference shown by y-axis 360 and the user device distance from the tower shown by x-axis 355. As the user device gets closer to tower 310, the user device can tolerate a higher PRB interference level. As the user device moves farther away from tower 310, the user device requires a lower PRB interference level.

In a similar manner, the lower right graph of FIG. 3 illustrates the above relationship for a user device operating within cell 335 region. The x-axis 370 represents a distance of a user device from the transmitting tower 320, where the distance from the tower increases to the left. The y-axis 375 represents the level of rf interference of the PRBs of spectrum 325, that can be assigned by scheduler 350 to the user device, where the rf interference increases upwards. The curve 380 illustrates an inversely proportional relationship between the PRB interference shown by y-axis 375 and the user device distance from the tower shown by x-axis 370. As the user device gets closer to tower 320, the user device can tolerate a higher PRB interference level. As the user device moves farther away from tower 320, the user device requires a lower PRB interference level.

The distance of a user device from the edge of its servicing cell is also a factor in determining what rf interference level of PRBs will be assigned by its respective scheduler. If a user device is located near the middle of its servicing cell, such as the middle of cell 330 or cell 335, then the user device communication channel should be reasonably strong with a small level of rf interference. Therefore, one or more PRBs with a high rf interference level could be assigned by scheduler 345 or 350 to the user device, in order to maintain the user device connection. As a user device moves closer to the edge of its respective servicing cell 330 or 335, the communication channel of the user device will likely have more rf interference, and therefore, the user device will have an increased need for PRBs with a low rf interference level. Therefore, as the rf interference level of the communication channel of the user device increases, there is a need for a decreased rf interference level in the assigned PRBs. Likewise, as the rf interference level of the communication channel of the user device decreases, there is a higher tolerance for an increased rf interference level in the assigned PRBs. The assignment of PRBs by the scheduler 345 or 350, according to levels of rf interference, provides an efficient means of managing available PRBs.

Figure 4:
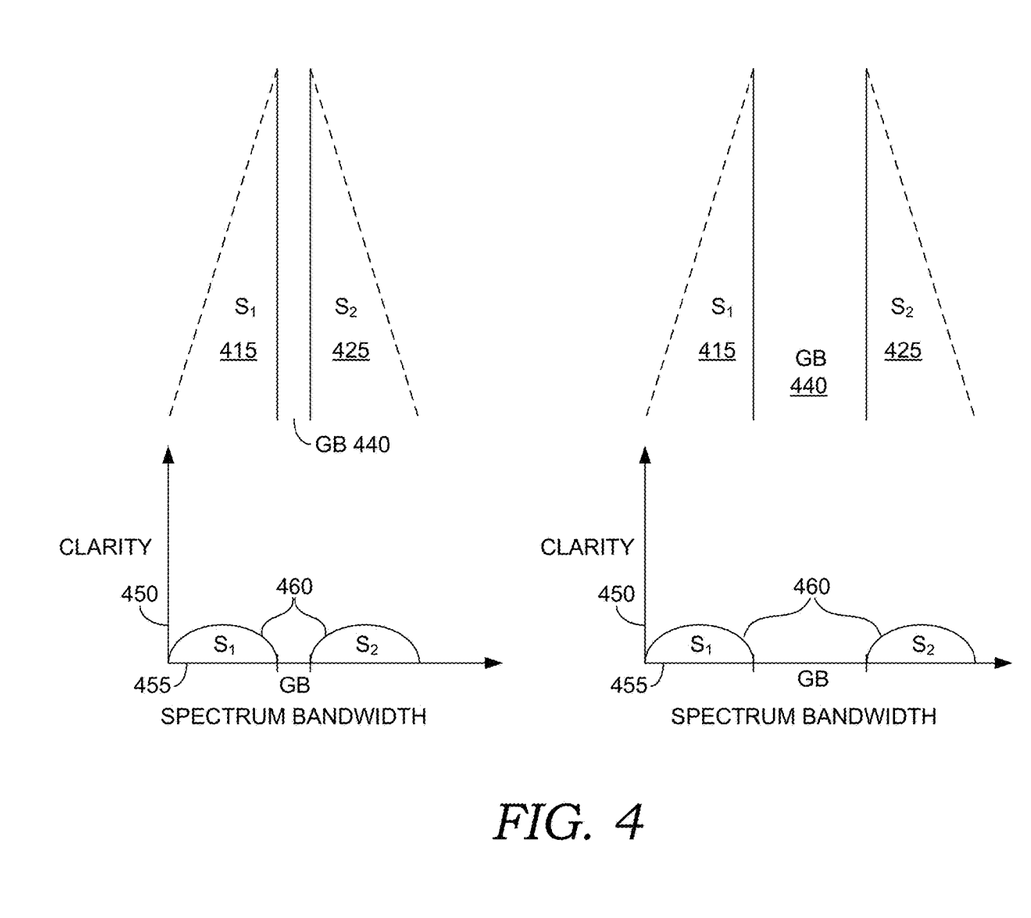
FIG. 4 is an illustration of the relationship of guard blocks to the rf interference level according to embodiments of the invention.

FIG. 4 illustrates the effect of guard blocks with respect to the rf interference level of PRBs across a spectrum bandwidth, and the clarity or quality level of the user device communication channel. The clarity of a user device communication channel will increase with decreasing rf interference of the user device communication channel. The lower graphs of FIG. 4 illustrate the relationship of the quality or clarity of a user device communication channel, represented by y-axis 450 to the location of the user device within a transmitted spectrum, represented by the x-axis 455. If the user device is located near the middle of spectrum 415 or 425, then the clarity will be higher. As the user device moves towards any edge of spectrum 415 or 425, then the clarity of the user device communication channel will decrease. This relationship is illustrated by curves 460. This concept could also be expanded to a third dimension, although just two dimensions are illustrated in FIG. 4 for simplicity.

As a user device moves toward the edge of its servicing cell, such as the cell covered by spectrum 415 or 425, a stronger communication signal is transmitted by the user device to maintain its connection. As a result, a larger guard block, such as GB 440 is needed between its servicing cell and an adjacent servicing cell, as illustrated by the two right diagrams of FIG. 4. However, using embodiments of the invention, one or more PRBs with a low rf interference level are assigned by an associated scheduler to a user device when the user device is near its servicing cell edge. As a result, the user device is able to maintain its communication channel connection without a corresponding increase in user device transmission power. Therefore, there is less interference at a cell edge, which would allow a smaller guard block to be utilized, as illustrated by the two left diagrams of FIG. 4. A guard block occupies a certain amount of bandwidth. Therefore, a larger guard block translates to less bandwidth available for communications. By using embodiments of the invention, the associated scheduler can modify the size of the guard block to apply more bandwidth for communications and less bandwidth for guard blocks. The diagrams of FIG. 4 are not drawn to scale. Certain bandwidth ranges of FIG. 4 are drawn smaller or larger than the actual measurements would be for those features, in order to better focus on certain features.

Figure 5:
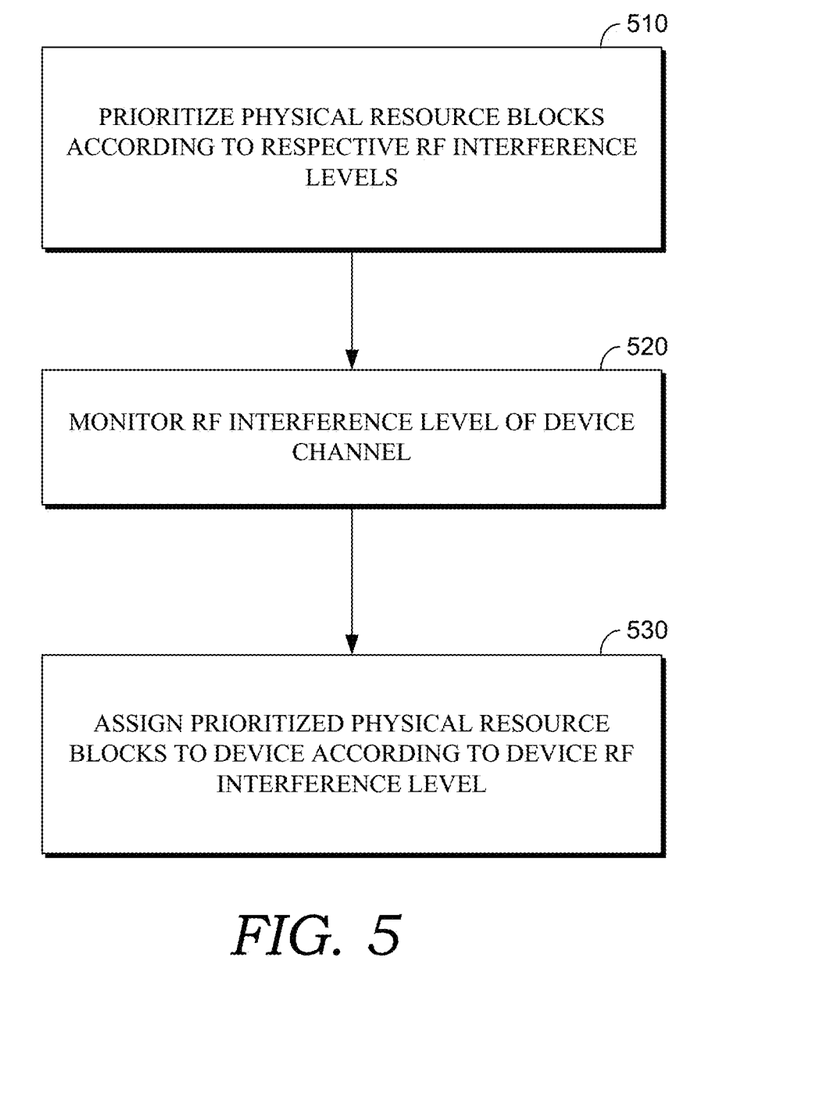
FIG. 5 is a flow diagram for a method of scheduling physical resource blocks according to embodiments of the invention.

FIG. 5 is a flow diagram that illustrates a method of scheduling physical resource blocks. A physical resource block (PRB) is a carrier or channel used to convey communication from a communication tower to a user device and from the user device to the communication tower. A communication carrier, such as a telecommunication carrier, controls a certain number of PRBs within a particular frequency bandwidth range, also referred to as a spectrum. The level of external rf interference will vary across the contiguous PRBs. The center PRBs will have the least amount of rf interference, while the PRBs at the edges of the contiguous group will have the most rf interference. PRBs within the middle regions of the contiguous group will have a moderate amount of rf interference. In an embodiment of the invention, the PRBs are divided into zones according to their respective rf interference levels by an associated scheduler. The zones are prioritized by the scheduler according to their respective rf interference levels, in step 510 of FIG. 5.

There will be varying levels of rf interference across a communication channel of a user device due to noise from external structures or conditions. A scheduler within the base station, such as that described above with reference to FIG. 3, monitors the level of rf interference across a user device communication channel in step 520 of FIG. 5. The scheduler assigns one or more of the prioritized PRBs to a user device, based on the level of rf interference of the user device in step 530. As a result, one or more PRBs having a high rf interference level will be assigned to a user device communication channel having a low rf interference level. Likewise, one or more PRBs having a low rf interference level will be assigned to a user device communication channel having a high rf interference level. Stated another way, one or more PRBs having a low rf interference level will be assigned to a user device that has a low quality communication connection. If a user device with a low quality communication connection is assigned one or more PRBs having a high rf interference level, then the connection is at risk of being lost. A user device experiencing a high rf interference level may be a user device operating at an edge of its servicing cell.

The PRBs are assigned to a user device by the scheduler, such that the rf interference level of the assigned PRBs is directly proportional to a strength of a user device communication connection. The scheduler can assign the PRBs during an uplink communication or during a downlink communication. One or more computer-readable storage media, with instructions embodied thereon, that when executed by a computing device, perform the above-described method of scheduling PRBs is also contemplated in embodiments of the invention.

Figure 6:
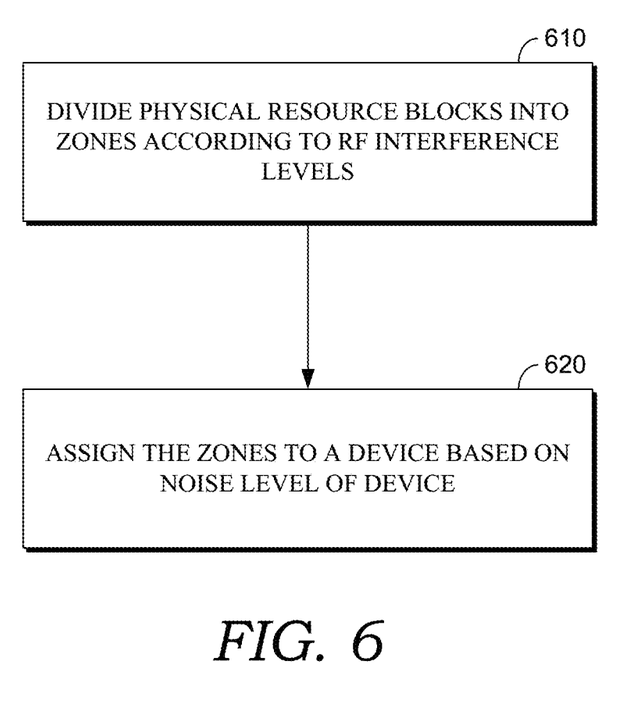
FIG. 6 is a flow diagram for a method of scheduling physical resource blocks according to embodiments of the invention.

FIG. 6 is a flow diagram that illustrates another method of scheduling PRBs. A plurality of contiguous PRBs are divided into one or more zones according to a level of rf interference of the respective PRBs in step 610. A scheduler of a base station assigns one or more of the zones to a user device in step 620. The assignment is based upon a noise level of a communication channel of the user device. The noise level of a user device can result from various sources such as, but not limited to interference from other user devices, interference from a nearby infringing spectrum, physical structures, geographic structures, and weather conditions. The scheduler assigns the one or more zones based upon the rf interference level of the zones and the noise level being experienced by the user device. As a result, one or more low rf interference zones will be assigned to a user device experiencing a high noise level communication connection. Likewise, one or more high rf interference zones will be assigned to a user device experiencing a low noise level communication connection.

In an embodiment of the invention, two or more assigned zones comprise adjacent bandwidths. Embodiments of the invention also contemplate monitoring the rf interference level of the communication channel of the user device, via a scheduler, working in conjunction with a base station of a servicing cell tower. One or more computer-readable storage media, with instructions embodied thereon, that when executed by a computing device, perform the above-described method of scheduling PRBs is also contemplated in embodiments of the invention.

Many different arrangements of the various components depicted, as well as components not shown, are possible without departing from the spirit and scope of the several embodiments of the invention. Embodiments of the invention have been described with the intent to be illustrative rather than restrictive.

It will be understood that certain features and subcombinations are of utility and may be employed without reference to other features and subcombinations and are contemplated within the scope of the claims. Not all steps listed in the various figures need be carried out in the specific order described.

The technology claimed is:

1. A base station for scheduling physical resource blocks, the base station having memory, processor, and data storage components, and further comprising:
   a scheduler that assigns a plurality of physical resource blocks (PRB) of a first frequency spectrum of PRBs that is separated from an adjacent frequency spectrum of PRBs by an interference guard block having a frequency range,
   wherein the plurality of PRBs comprises:
   a first PRB at a center of the first frequency spectrum of PRBs, the first PRB having a low radio frequency (rf) interference with respect to at least one PRB of the adjacent frequency spectrum of PRBs, and
   a second PRB at an edge of the first frequency spectrum of PRBs having a high rf interference with respect to the at least one PRB of the adjacent frequency spectrum of PRBs,
   wherein the scheduler assigns the first PRB at the center of the first frequency spectrum of PRBs to a first communication channel of a first user device having a high rf interference level,
   wherein the scheduler assigns the second PRB at the edge of the first frequency spectrum of PRBs to a second communication channel of a second user device having a low rf interference level, and
   wherein the scheduler determines the frequency range of the interference guard block based on the assigned first and second PRBs, thereby minimizing the frequency range of the interference guard block.

2. The base station of claim 1, wherein the base station accesses an enhanced Node B (eNode B) network.

3. The base station of claim 1, wherein the base station accesses a long term evolution (LTE) network.

4. A base station for scheduling physical resource blocks, the base station having memory, processor, and data storage components, and further comprising:
   a scheduler that assigns a first frequency spectrum of physical resource blocks (PRB) to minimize a frequency range of a guard bock, wherein the first frequency spectrum of PRBs comprises a first zone of PRBs located near a first edge of the first frequency spectrum, the first edge of the first spectrum defined the interference guard block,
   wherein the first zone of PRBs has a high radio frequency (rf) interference with respect to a second zone of PRBs located near a second edge of an adjacent frequency spectrum of PRBs, the second edge of the adjacent frequency spectrum defined by the interference guard block,
   wherein the scheduler assigns the first zone of PRBs located near the first edge of the first frequency spectrum to a communication channel of a user device having a low rf interference level, and wherein the scheduler determines the frequency range of the interference guard block based on the assigned first zone of PRBs, thereby minimizing the frequency range of the guard block.

5. The base station of claim 4, wherein the base station accesses an enhanced Node B (eNode B) network.

6. The base station of claim 4, wherein the base station accesses a long term evolution (LTE) network.

7. A computer-implemented method of scheduling physical resource blocks using a computing system having memory, processor, and data storage components, the computer-implemented method comprising:

determining that a first frequency spectrum of physical resource blocks (PRBs) comprises a first zone of PRBs located near a center of the first frequency spectrum;

determining that the first zone of PRBs have a low radio frequency (rf) interference with respect to at least a second zone of PRBs of an adjacent frequency spectrum of PRBs that is separated from the first frequency spectrum of PRBs by an interference guard block having a frequency range; and assigning, via a scheduler of a base station, the first zone of PRBs located near the center of the first frequency spectrum of PRBs to a first user device experiencing a high rf interference level; and determining the frequency range of the interference guard block in response to the assigning of the first zone of PRBs.

8. The computer-implemented method of claim 7, wherein the rf interference level of the assigned first zone of PRBs is inversely proportional to the rf interference level experienced by the first user device.

9. The computer-implemented method of claim 7, wherein the assigning occurs during an uplink communication.

10. The computer-implemented method of claim 7, wherein the assigning occurs during a downlink communication.

11. The computer-implemented method of claim 7, wherein the assigning comprises: assigning a second zone of PRBs located near an edge of the first frequency spectrum of PRBs having a low interference level with respect to the adjacent frequency spectrum of PRBs to second device experiencing a low rf interference level, the edge of the first frequency spectrum of PRBs defined by the interference guard block.

12. The computer-implemented method of claim 7, wherein the high radio frequency interference level experienced by the first user device comprises a device operating at an edge of a cell service.

13. The computer-implemented method of claim 7, further comprising: prioritizing a plurality of physical resource blocks within the first zone according to their respective rf interference levels.

14. The computer-implemented method of claim 7, further comprising:

monitoring the rf interference level of a communication channel of the user device.

* * * * *